US008049162B2

(12) United States Patent
Miteva et al.

(10) Patent No.: US 8,049,162 B2
(45) Date of Patent: Nov. 1, 2011

(54) ZEEMAN-SLOWER, COIL FOR A ZEEMAN-SLOWER DEVICE AND A METHOD FOR COOLING AN ATOM BEAM

(75) Inventors: Tzenka Miteva, Stuttgart (DE); Gabriele Nelles, Stuttgart (DE); Akio Yasuda, Tokyo (JP); Stanislav Balouchev, Mainz (DE)

(73) Assignee: Sony Deutschland GmbH, Berlin (DE)

(*) Notice: Subject to any disclaimer, the term of this patent is extended or adjusted under 35 U.S.C. 154(b) by 135 days.

(21) Appl. No.: 12/305,098

(22) PCT Filed: May 24, 2007

(86) PCT No.: PCT/EP2007/004639
§ 371 (c)(1), (2), (4) Date: Sep. 10, 2009

(87) PCT Pub. No.: WO2007/147477
PCT Pub. Date: Dec. 27, 2007

(65) Prior Publication Data
US 2010/0012826 A1 Jan. 21, 2010

(30) Foreign Application Priority Data
Jun. 22, 2006 (EP) .................................... 06012883

(51) Int. Cl.
*H01S 1/00* (2006.01)
*H01S 3/00* (2006.01)
*H05H 3/02* (2006.01)

(52) U.S. Cl. ...................................................... 250/251

(58) Field of Classification Search .................. 250/251
See application file for complete search history.

(56) References Cited

U.S. PATENT DOCUMENTS

| | | | | |
|---|---|---|---|---|
| 4,354,108 | A * | 10/1982 | Toyama et al. | 250/251 |
| 5,094,530 | A * | 3/1992 | Rogasch et al. | 356/307 |
| 5,527,731 | A * | 6/1996 | Yamamoto et al. | 250/283 |
| 5,834,769 | A | 11/1998 | Fujita et al. | |
| 5,851,725 | A * | 12/1998 | McClelland | 430/269 |
| 5,998,997 | A * | 12/1999 | Ramanathan et al. | 324/309 |
| 6,657,188 | B1 * | 12/2003 | Hulet et al. | 250/251 |
| 2007/0075794 | A1 * | 4/2007 | Happer et al. | 331/94.1 |

OTHER PUBLICATIONS

Lison et al. "High-brilliance Zeeman slowed cesium atomic beam" Physical Review A, vol. 61, 013405, Dec. 10, 1999.*
Phillips "Laser Cooling and trapping of neutral atoms" Rev. of Mod. Phys., vol. 70, No. 3, Jul. 1998, pp. 721-742.*
Dedman et al. "Optimum design and constructino of a Zeeman slower for use with a magneti-optic trap" Rev. of Sci. Instr. vol. 75, No. 12, Dec. 2004, pp. 5136-5142.*

(Continued)

*Primary Examiner* — Robert Kim
*Assistant Examiner* — Brooke Purinton
(74) *Attorney, Agent, or Firm* — Oblon, Spivak, McClelland, Maier & Neustadt, L.L.P.

(57) ABSTRACT

A Zeeman-slower device, a coil for such a Zeeman-slower device, and a method for cooling an atom beam. The Zeeman-slower includes a cooling section including an inner passage extending along a longitudinal axis, the inner passage having a cross-section perpendicular to the longitudinal axis, wherein the area of the cross-section of the inner passage increases monotonously along the longitudinal axis at least in a part of the cooling section.

17 Claims, 6 Drawing Sheets

OTHER PUBLICATIONS

Schuenemann, U. et al., "Magneto-optic trapping of lithium using semiconductor lasers", Optics Communications, vol. 158, No. 1-6, pp. 263-272, XP004150780, (1998).

Moore, I.D. et al., "Towards ultrahigh sensitivity analysis of 41 Ca", Nuclear Instruments & Methods in Physics Research B, vol. 204, pp. 701-704, XP004422452, (2003).

Joffe, M.A. et al., "Transverse cooling and deflection of an atomic beam inside a Zeeman slower", Journal of the Optical Society of America B, vol. 10, No. 12, pp. 2257-2262, XP002405870, (1993).

Thomas, P., "Numerical Simulation of the Compressor Coil of the Plasma Dynamic Accelerator", IEEE Transactions on Magnetics, vol. 33, No. 1, pp. 272-277, XP011031236, (1997).

* cited by examiner

ZEEMAN-SLOWER, COIL FOR A ZEEMAN-SLOWER DEVICE AND A METHOD FOR COOLING AN ATOM BEAM

The invention relates to a Zeeman-slower, to a coil arranged in the Zeeman-slower device and to a method for cooling an atom beam.

BACKGROUND OF THE INVENTION

A Zeeman-slower includes a coil generating a longitudinally decreasing magnetic field and a laser reducing the longitudinal velocity of the atoms. This effect is also referred to as laser cooling. In order to reduce the transversal velocity of the atoms, additional laser devices downstream the coil reduce the transversal velocity of the atoms in one or two transversal directions, providing a transversal collimation of the atomic beam. In the publication "Influence of the magnetic field gradient on the extraction of slow sodium atoms outside the solenoid in the Zeeman-slower", by Yoshiteru Kondo al, Japanese Journal of applied physics, volume 36, part 1, No. 2, pages 905-909, a cooling device for cooling an atomic beam is described, in which a Zeeman-slower provides longitudinal deceleration. In a second stage arranged downstream the solenoid or coil, the atoms are decelerated in transversal directions.

In known laser cooling devices, at least two separated laser cooling equipments are used, one for longitudinal cooling and one for transversal cooling, which all have to be aligned to the atomic beam. An oven produces a hot atomic beam, which is longitudinally decelerated in a first coil. After the first longitudinal deceleration, transversal deceleration is performed. However, only the atoms a direction matching to the passage of the first coil can be further decelerated by the second coil. This restricts the flux of atoms provided by the Zeeman-slower leading to longer process intervals if used for deposition. It is therefore an object of the invention to provide a Zeeman-slower allowing a higher flux of atoms.

SUMMARY OF THE INVENTION

This object is solved by the Zeeman-slower of claim 1, by the coil of claim 12 and by the method for cooling an atom beam of claim 13.

The Zeeman-slower of claim 1 has a cooling section comprising an inner passage extending along a longitudinal axis, the inner passage having a cross-section perpendicular to the longitudinal axis. According to the invention, the area of the cross-section of the inner passage increases monotonously along the longitudinal axis at least in the cooling section. A "monotonous" increase in the sense of this invention both covers a "strictly monotonous" increase, i.e. a real increase of the cross-section area when going along the longitudinal axis, without any constant-cross-section areas, and a monotonous increase in the general and more broader sense, i.e. covering both parts, which strictly increase, but possibly also certain areas or regions along the longitudinal axis, where the area of the cross section remains constant.

An "inner passage" in the sense of this invention has to be understood as a complete physical space surrounded by the inside of the coils. Further the longitudinal component of the magnetic field is the component of the magnetic field which is along the longitudinal axis L of the inner passage.

This extending passage along the cooling section accounts for the extension of the atomic beam emitted by the oven. The monotonic increase of the passage starting from the input to the output end along the longitudinal axis assures that also atoms with a direction different from the longitudinal axis can contribute to the flux. Since the oven emits atoms in any direction, a higher number of atoms is provided at the output of the Zeeman-slower. In particular, the atoms transmitted in a direction declined to the longitudinal axis are not stopped by the inner surface of the passage like in prior art Zeeman-slowers. Rather, a beam with a higher output diameter can be provided leading to a higher flux.

Preferably, the cooling section extends along the longitudinal axis from an input end to an output end, wherein the area of the cross-section at the output end is at least 120% of the area of the cross-section at the input end allowing a substantial increase of the total flux.

In one embodiment, the cross-section of the inner passage has a circular shape, simplifying the construction of the coil. Advantageously, the Zeeman-slower comprises a coil surrounding the inner passage to provide a magnetic field in the inner passage in the direction of the longitudinal axis, wherein the magnetic field decreases monotonously along the longitudinal axis and is substantially homogeneous in the cooling section in a plane perpendicular to the longitudinal axis. Such a magnetic field provides constant conditions throughout volume defined by the passage and increases the cooling performance.

In one embodiment, the Zeeman-slower comprises at least one extraction coil adjacent to the output end and arranged to produce a magnetic field, which is substantially different from the magnetic field in the inner passage near the output end produced by the coil surrounding the inner passage. The arrangement of the extraction coil directly after the output of the slower abruptly ends the cooling conditions, such that the cooling only takes place in the passage and is suppressed outside the passage. Of course, the magnetic field of the extraction coil is combined with the magnetic field of the coil arranged around the passage such that the magnetic field of both has to be taken into account when designing the Zeeman-slower. The extraction coil is also known as anti-phase coil. Preferably, the magnetic field generated by the extraction coil is opposite to the magnetic field of the coil surrounding the passage.

To further improve the cooling performance, a deflector is provided adapted to deflect at least a part of light impinging onto the deflector into the inner passage inclined to the longitudinal axis. This leads to additional transversal cooling since the inclined angle of the light provides deceleration, i.e. cooling, in a direction different from the longitudinal axis. This allows a combined transversal and longitudinal cooling in the coil. The transversal cooling collimates the beam, which improves the flux and the beam density. Also, fewer atoms reach the wall defining the passage and a higher proportion of input atoms reach the output of the passage. A preferred embodiment comprises a reflective surface in at least parts of the inner passage, the reflective surface being arranged to receive light from the deflector and to reflect light into the inner passage inclined to the longitudinal axis. With this embodiment, illuminating the output end of the passage has two effects: (A) light directly hits the atomic beam leading to longitudinal deceleration, and (B) light impinges onto the reflective surface and is reflected onto the atom beam in a substantially declined direction leading to a deceleration with an substantial transversal component. Therefore, one light beam can effect longitudinal as well as transversal cooling at the same time when impinging onto the output end with varying angles of inclination.

Advantageously, a deflector is adapted to deflect light onto the output end (220) producing a light energy distribution on the cross-section of the output end (230). The light energy distribution is rotationally symmetrical to the longitudinal axis (L) and is:

(Alt. 1) negative exponential depending on the distance to the longitudinal axis (L) without an offset to the longitudinal axis (L) or (Alt. 2) negative exponential depending on the distance to the longitudinal axis (L) with an offset to the longitudinal axis (L) or (Alt. 3) substantially constant throughout the cross-section of the output end (230).

In Alt. 1, the highest intensity is in the centre and decreases exponentially towards the circumference of the passage. A high amount of light intensity is used for longitudinal cooling, while only a small part is reflected and impinges at an inclined angle. In Alt. 2, a substantial part of the light performs direct longitudinal cooling. However, also a substantial part is reflected and is emitted onto the atom beam in an inclined angle leading to substantial transversal cooling components. The location of the maximum of the negative exponential distribution also defines, at which location along the longitudinal axis the maximum transversal deceleration occurs. This effect may be used to concentrate the transversal cooling in certain areas. Both, Alt. 1 and Alt. 2, form a Gaussian distribution and can be readily implemented by a corresponding scanning apparatus. Alt. 3 provides a homogenous light intensity and, consequently, a homogenous distribution of the transversal deceleration along the entire length of the passage. Of course, several light sources with different distributions can be combined. Also, one light source can provide a combination of the above describes distributions.

According to the invention, one embodiment of the Zeeman-slower comprises a laser device emitting a laser beam on the deflector, the deflector being arranged to modulate an angle between the longitudinal axis of said at least one coil and the laser beam. This may be used as light source or as scanning apparatus to produce the above mentioned light intensity distributions. Preferably, deflector is adapted to direct light onto the cross-section of the output end to illuminate the output end with a distribution of light energy covering at least a partial area of the output end.

Further, the object stated above is solved by a coil having an inner surface adapted to define the inner passage of the Zeeman-slower according the invention, the inner surface comprising at least one reflective area adapted to reflect light into the inner passage. The combination of the extending passage defined by the Zeeman-slower and the reflective inner surface of the coil allows both, a high flux of atoms, as well as combined transversal and longitudinal deceleration. This coil improves the performance if integrated in a Zeeman-slower and connected to an oven.

Additionally, the object stated above is solved by the method for cooling a atom beam, comprising the steps of: providing a magnetic field; emitting an atom beam into the magnetic field; directing at least a part of a light beam onto the atom beam, the method being characterized in that the step of emitting an atom beam includes emitting an atom beam along the longitudinal axis, the atom beam having a cross section substantially expanding along the longitudinal axis in a direction perpendicular to the longitudinal axis. As mentioned above, the expansion of the atom beam leads to a higher volume in which the deceleration can be performed and leads to a higher yield of cooled atoms. Preferably the method includes the steps of providing an inner passage having a cross-section area increasing monotonously along the longitudinal axis, the inner passage being adapted to accommodate the atom beam. Advantageously, the area of the cross-section of the atom beam and/or of the inner passage is expanded in total at least about 20% along the longitudinal axis. By this extension, the more atoms can be contained in the cooling volume. A preferable embodiment of the method includes the steps of providing the magnetic field comprises providing the magnetic field parallel to the longitudinal axis, the magnetic field having a magnetic field strength decreasing along a longitudinal axis, the magnetic field being substantially homogenous in a plane perpendicular to the longitudinal axis, the method further comprising the step of: providing an additional deceleration of the atom beam in a direction perpendicular to the longitudinal axes by directing the at least part of the light beam onto the atom beam in a direction inclined to the propagation direction of the atom beam. This adds a transversal deceleration component to the longitudinal deceleration. A substantial transversal cooling component can be achieved by directing at least a part of a light beam onto the atom beam comprises reflecting at least a part of the light beam onto the atom beam and inclined to the atom beam, at a location substantially displaced from the longitudinal axis.

According to the invention, this method is used for coating material. In an advantageous embodiment of the method, the method is used for manufacturing organic opto-electronic devices and additionally comprises the step of using an embodiment of the Zeeman-slower according to the invention.

The concept underlying the invention is to use an extending atomic beam and a Zeeman-cooler, which can accommodate this beam. Since the atom beam is generated by an oven, which inherently emits atoms in any direction, the substantial increase of allowable angle leads to an intense increase of flux. Another aspect of the invention is to use the increased angle to emit inclined laser beams into the cooling passage, which provide a transversal deceleration component. If the atomic beam is transversally decelerated during its movement through the passage after having entered the cooling passage, the expansion of the beam can be significantly reduced. Therefore, two groups of laser beams are used, one parallel to the longitudinal axis and one inclined thereto. A deflector may be used to split and deflect an incoming laser beam into a parallel laser beam and an inclined laser beam. The inclined laser beam is scanned to cover the output of the passage with a laser beam pattern, which partly impinges on a reflecting surface directing the laser beam into the passage in an inclined direction. The laser beam is counter-propagating to the atom beam.

When used for producing cooled atoms for a coating process, the time for coating can be reduced to a small percentage of the time that is needed with conventional Zeeman-slowers. Therefore, the present invention is particularly dedicated for yielding a high throughput of cooled atoms for coating sensitive material surfaces, in particular organic materials, e.g. for manufacturing organic opto-electronic devices and to provide organic LEDs with an electrical contact.

DETAILED DESCRIPTION OF THE INVENTION

Figure 1:
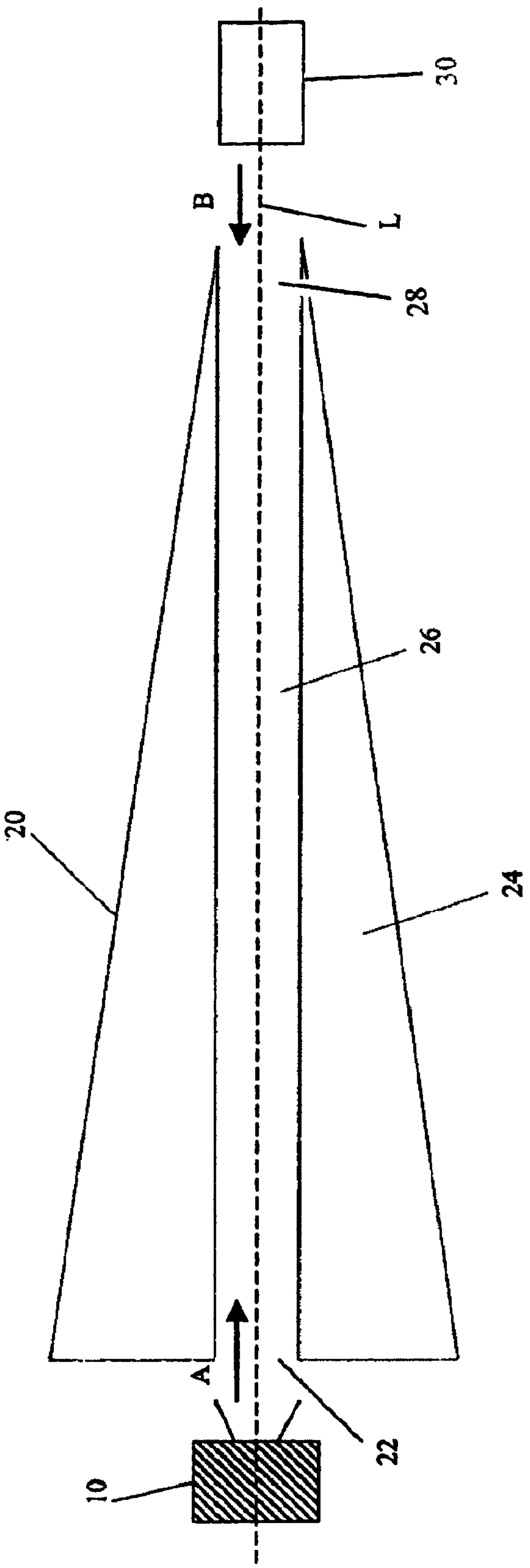
Fig. 1 Related Art
FIG. 1 shows a schematic diagram of a prior art Zeeman-slower illustrating the distribution of the individual turns of the winding.

For an effective cooling by the Zeeman-slower, the coil is adapted to provide a magnetic field distribution and the laser having an energy and wavelength providing a compensation of Zeeman-detuning and Doppler-detuning for the atom beam over a part or over the complete cross-section of the inner passage. During the cooling, i.e. deceleration according to the Zeeman effect, an atom absorbs a photon from the laser beam. After certain time $t_{local}$, the atom emits a photon, but now in arbitrary direction in the 4π environment. Because there is a well defined direction of the absorbed photon, but the direction of the emitted photon is arbitrary, a net change results in changing the impulse of the atom, and hence in the local velocity of the atom.

The laser provides a "blue tuning" with regard to the atoms, which depends on the type of atoms, which are cooled. E.g. approx. 300 MHz tuning towards higher frequencies is a good value. In an embodiment, the "blue tuning" is between 1 MHz and 1 GHz.

In order to provide deceleration of the atoms, the following relation has to be fulfilled:

$$\Delta = \frac{V_{atom}}{\lambda_{Laser}} - \frac{\mu_B B}{h} - \Delta v_{Laser}$$

where Δ is the local detuning from the atomic resonance; $V_{atom}$—the local velocity of the atom; $\lambda_{Laser}$—wavelength of the laser; $\mu_B$—the magneton of Bohr; h—Planck's constant; B—local magnetic field strength; $\Delta v_{Laser}$—laser detuning, i.e. the deviation of the laser frequency from the atomic resonance, measured in MHz, when the laser frequency is of order of hundreds of THz. The first fraction represents the Doppler detuning, the remaining term represents the Zeeman detuning.

The saturation S is given as:

$$S = \frac{I}{I_{Sat}} * \frac{(\gamma/2)^2}{(\gamma/2)^2 + \Delta^2}$$

where S—is the saturation parameter; I—the local light intensity; $I_{sat}$—the saturation intensity, which depends on the atom type; γ—the natural width of the atomic resonance, for instance for Ca, γ=34.58 MHz and Δ is the local detuning from the atomic resonance.

The time needed for one full cycle of absorption of a photon and re-emission of photon in the 4π environment is:

$$t_{local} = (1/S + 2) * \tau$$

Herein, τ is the period of the specific atomic transition, i.e.:

$$\tau = 1/2\pi\gamma.$$

The input velocity of the atoms is ca. 400-1400 m/s. In one embodiment, the input velocity is approx. 1000 m/s. The output target velocity is about 1 m/s-300 m/s. Preferably, the output target velocity is 100 m/s. The output target velocity depends on the desired temperature on the substrate, which is to be covered. The output intensity of the atom beam is approx $10^{12}$ atom/scm$^2$. However, also $10^{10}$-$10^{14}$ or higher are to be expected and used.

Using Calcium, a photon/absorption emission period by the atoms is 4.9 ns in resonance. The wavelength of the laser has to be adjusted accordingly and depending on the magnetic field strengths. Organic or inorganic materials active layers are coated with a layer, e.g. formed of Calcium having a thickness of ca. 1-80 nm. During the coating processes, the temperature of the material, which is to be covered should not strongly exceed RT (ca. 300 K) to avoid any damages. An atom beam having the target velocity of ca. 150 m/s is with temperature ca. 300 K (RT) In the prior art, no cooled atom beams have been ever used for coating of active layers in optoelectronic devices because in the prior art atom beams are with the intensities of $10^8$-$10^{10}$ atoms/scm$^2$ with velocities 1-10 m/s and if used will be leading to a duration of the coating process of 30-50 h. and non-desired undercooling.

The present invention allows atom beams with the intensity up to $10^{12}$-$10^{14}$ atoms/sec leading to reduction of the duration by an order of magnitude of 3-4. An oven emits atoms typically with velocity of approx. 1000 m/s.

The atom beam is preferably formed of Ca, Ag, Cr, Fe and Al atoms. The pressure in the Zeeman-slower (in the inner passage) is preferably in the range of $10^{-1}$-$10^{-8}$ Pa.

One embodiment of the coil has a length between 200 mm and 500 mm and preferably of approx. 350 mm. The input diameter is between 20-250 mm, preferably between 40 mm and 120 mm and advantageously 80 mm. The output diameter lies between 25 mm and 400 mm, preferably between 40 mm and 80 mm and is advantageously approx 50 mm.

The current supplied to the coil is between 3 A and 30 A and preferably between 8 and 15 A. In one particular embodiment, the current is approx. 11.5 A. The power supplied to the coil is between 1 and 30 kW and preferably 5-20 kW. In one embodiment, the power supplied to the coil is 14 kW. In general, the coil is supplied with a power of several kW. However, cooling should be applied to maintain the temperature of the elements or wall surrounding the inner passage below 110° C. Preferably, the coil comprises an extraction coil adjacent to said output end being arranged around the longitudinal axis and located outside the cooling section for maintaining a high transversal homogeneity at and near the output end. The extraction coil is preferably arranged at the output end of the coil and comprises at least two coils, one coil providing a magnetic flux component anti-parallel to atom beam along the longitudinal axis, and another coil providing a magnetic flux component parallel to atom beam along the longitudinal axis. In one embodiment shown in FIG. 3, the coils are substantially identical (apart from the direction of the produced magnetic field component), while the coil producing the anti-parallel field component is arranged between the cooling section of the coil and the coil producing the parallel field component.

According to the invention, the coil produces a magnetic field parallel to and having a magnetic field strength decreasing along a longitudinal axis, the magnetic field being substantially homogenous in a plane perpendicular to the longitudinal axis of the coil. A atom beam is directed into the magnetic field in a direction along a longitudinal axis. At least a part of a laser beam is directed onto the atom beam and at least a part of the same laser beam or another laser beam is directed on said atom beam in the magnetic field in a direction inclined to the longitudinal axis.

In a preferred embodiment, the coil has at least one winding adapted to provide a magnetic field in the direction of the longitudinal axis, the at least one winding being arranged such that the magnetic field is substantially homogeneous inside the coil in a plane perpendicular to the longitudinal axis throughout the coil and decreases towards the output end. This field distribution provides an effective longitudinal and transversal cooling for atom velocities decreasing along the longitudinal axis. Additionally or alternatively, the coil comprises at least one winding in the cooling section and at least another winding in the input section, allowing a precise adjustment of the magnetic field. The coil can comprise a plurality of windings being connected to each other or being supplied by a plurality of current sources. The windings of the coil can be separated into several parts or can have taps allowing the connection of one or more current supplies. When separated into a plurality of sections, the produced magnetic flux can be adjusted by adjusting each individual current flowing through the plurality of sections. In this way, the homogeneity and the longitudinal distribution of the magnetic field can be adjusted to the desired characteristics. Additionally, any inhomogeneities can be compensated by adjusting the respective current or currents or the designated power supply or supplies. Two lasers can be used, one for longitudinal cooling and one for an additional transversal cooling component. The transversal cooling component depends on the inclination between the inclined laser beam and the atom beam.

Alternatively, one laser beam can be used, which is separated in two beams, e.g. by the deflector or by an additional beam splitter. The beams are used for longitudinal cooling and for additional transversal cooling, respectively, as described above.

At least a part of the emitted laser beam is counter-propagating with regard to the atom beam, leading to longitudinal deceleration.

In one embodiment, the deflecting means deflects at least a part of the laser beam coaxially to the longitudinal axis and at least a part of the laser beam onto the deflector or reflector. Preferably, the deflecting means deflects in two distinct directions or, in another embodiment, in a first direction and a second direction, which are perpendicular to the longitudinal axis. Advantageously, the two distinct directions are perpendicular to each other or the first direction being perpendicular to the second direction, leading to a Cartesian orientation. The deflecting means can include a 2D-acousto-optical modulator for deflecting at least parts of the laser beam in two distinct directions both inclined to the longitudinal axis. In another embodiment the deflecting means comprising a first 1D-acousto-optical modulator for deflecting at least parts of the laser beam in a first direction as well as a second 1D-acousto-optical modulator for deflecting at least parts of the laser beam in a second direction being distinct from the first direction, the first and the second direction being inclined to the longitudinal axis of the coil or the passage.

According to the invention, the laser and the deflecting means are provided for generating a certain light intensity or light energy distribution, which is projected onto the output end of the passage. Alternatively, the light energy distribution can be Gaussian or higher order super-Gaussian distribution, having one maximum in the center, i.e. at the longitudinal axes, or can have a maximum displaced or offset from the center, similar to the cross section of a doughnut beam (Laguerre-Gaussian modes from different orders). Preferably, the energy distribution is uniform. However, the non-uniform distributions can provided with a less complex laser/deflector combination. The distribution of light energy illuminating the output end preferably covers the complete area of the output end. Alternatively, a substantial part of the center region is covered, preferably 40%, 70% or 80% of the area around the longitudinal axes. In one embodiment, the light energy is concentrated on a ring concentrically surrounding the center, which is the case of a Gaussian distribution displaced from the center, the center lying on the longitudinal axes.

In one embodiment, the deflecting means of the Zeeman-slower device comprises a 2D-acousto-optical modulator for deflecting at least parts of the laser beam in two distinct directions both inclined to the longitudinal axis, or, alternatively, comprises an first 1D-acousto-optical modulator for deflecting at least parts of the laser beam in a first direction and a second 1D-acousto-optical modulator for deflecting at least parts of the laser beam in a second direction being distinct from the first direction, the first and the second direction being inclined to the longitudinal axis. Acousto-Optical modulators provide a simple and fast control of the deflection direction by electrical signals.

In this embodiment, the two distinct directions or the first direction and the second direction are preferably perpendicular to the longitudinal axis. Alternatively, the two distinct directions are perpendicular to each other or the first direction being perpendicular to the second direction. This geometry forms a Cartesian system allowing a simplified control of the deflection directions provided by deflection means.

For controlling the deflection means, a control device suitably connected to the deflection means can be used, the control device providing at least a first signal and a second signal, each having amplitude and frequency such that at least a part of the laser beam is distributed on at least parts of the deflector.

In one embodiment, the Zeeman-slower device according to the invention further comprises a control device controlling the deflection means, the control device providing at least a first signal and a second signal, each having amplitude and frequency such that at least a part of the laser beam is distributed on at least parts of the deflector. The electrical controlling enables a precise deflection, which can be provided by conventional electronic controlling means.

Preferably, the first signal is a first sine-wave with a first amplitude and first frequency and the second signal is a second sine-wave with a second amplitude and a second frequency, the deflection means providing Lissajous-figures in a plane perpendicular to the longitudinal axis. Thus, the amplitudes and frequencies can be controlled to provide different forms and distributions of at least a part of the laser beam.

In a preferable embodiment, a first signal controlling the deflection means is a first sinewave with a first amplitude and first frequency and a second signal controlling the deflection means is a second sinewave with a second amplitude and second frequency. In this way, the deflection means provides Lissajous-figures in a plane perpendicular to the longitudinal axis. Preferably, the first amplitude equals the second amplitude leading to a circular symmetric light distribution.

Advantageously, at least a part of the laser beam is deflected in a first and a second direction, each perpendicular to the longitudinal axis and directing the laser beam towards the atom beam before directing at least a part of the laser beam on the atom beam. The step of deflecting may comprise: providing, for the first and the second direction, a respective first and second control signal controlling the degree of deflection in the respective first and second direction to spread at least a part of the laser beam energy on at least parts of the plane perpendicular to the longitudinal axis.

The wavelength of the laser strongly depends on the cooled atom type. For instance the wavelength for Ca is 423 nm. A person skilled in the art is capable of selecting the appropriate wavelength for the respective atom type. The laser power preferably is approx 50 mW. However, the laser power may range from 5 mW and 50 mW. Preferably, the laser power lies between 10 mW and 200 mW. Advantageously, the laser line width is about 5-20 MHz and preferably 10 MHz. However, any value between 0.1 MHz-50 MHz may be used.

As mentioned above, the inner passage of the Zeeman slower, i.e. the inner passage of the coil, in which the deceleration of the atoms occurs, extends towards its output end. The cross sectional area of the inner passage increases monotone. In one embodiment, the increase is constant, leading to an inner passage having the shape of a cone extending from the input end to the output end. Preferably, the cross section is cylindrical. In one embodiment, the inner diameter of the slower is: $a=r^{0.6}$, r being the distance to the input end of the inner passage. Of course, this shape can only apply for a part of the passage, i.e. for the cooling section. Power coefficients other than 0.6 (smaller or bigger) can be used too.

The working principle of Zeeman-cooling in view of the spin of the atoms can also be characterized as follows. The magnetic field splits the spin of the atoms into levels, which is also called Zeeman-effect. The atoms at the input end have a high velocity leading to a substantial Doppler-shift related to the laser beam emitted towards the atomic beam. The excitation level of the atoms is split and shifted by the Zeeman-effect and therefore, if the excitation level shifted by the Zeeman-effect is in balance with the Doppler-shift, the impulse of the laser is absorbed by the atoms. When the atoms fall back from their excited level, the energy equivalent to the level difference is emitted. The absorption of the laser impulse adds an impulse towards direction B (c.f. FIG. 1), whereas the reemitted energy leads to an impulse with a random direction. For a plurality hits, the velocity of the atom or atom reduced is in direction A (c.f. FIG. 1), which is referred to as longitudinal deceleration or cooling. Since the atoms at the output end of the passage are substantially slower than the atoms at the input end, the appropriate magnetic field in view of the reduced Doppler-Shift at the output end is lower than for atoms at higher velocities at the input end. In the prior art, extra stages are provided for reducing the transversal velocities, the stages being arranged after the output end of the Zeeman-slower, i.e. downstream the atomic beam.

FIG. 1 shows the principles of a Zeeman-slower according to a prior art. The atoms, which are to be cooled, are generated by an oven 10 and emitted into an input end 22 of a coil 20. The coil includes windings 24 which are wound around an inner passage 26 through which the atoms are emitted from the input end 22 to an output end 28 of the coil. The inner passage 26 is a cylinder defined by the circular input end and output end and the cylindrical inner walls of the coil 20. The oven 10 emits a atom beam in one direction A into the coil and along the longitudinal axis L of the coil towards the output end 28. At the output end 28, a laser device 30 emits a laser beam into the output end in a direction anti-parallel to direction A along the longitudinal axis towards and anti-parallel to the atom beam travelling through the coil.

Figure 2:
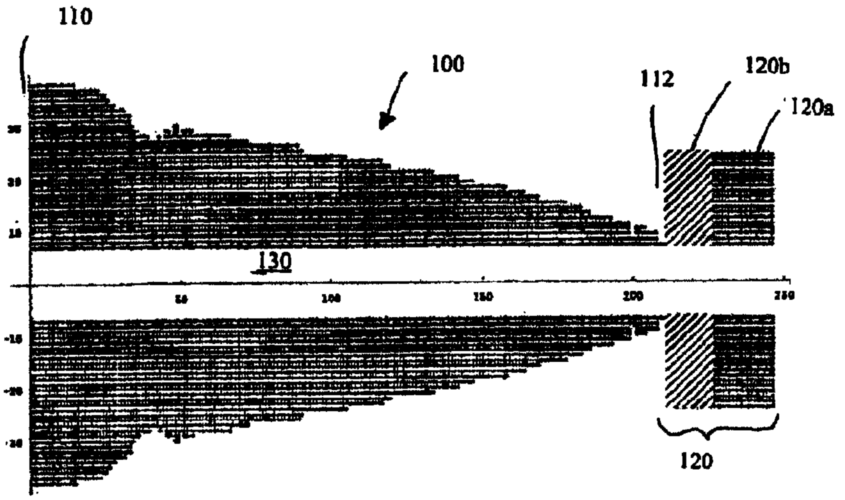
Fig. 2 Related Art
FIG. 2 is a cross section of a prior art coil of the Zeeman-slower.

In FIG. 2, the cross section of a conventional Zeeman-slower coil 100 is shown. The number of winding per length ("the winding density") decreases from the input side 110 towards the output side 112 of the coil. Adjacent to the output end of the coil 112, an extraction coil 120 is arranged. Extraction coils are also denoted as antiphase-coils. The extraction coil 120 consists of one block **120*a* having the same winding direction as the coil 100 and another antiphase-block 120*b* having a winding direction opposed to the one of block 120*a*. The passage 130 formed by the coil 100 is coaxial with the center axis of the coil and has the shape of a cylinder extending between the input 110 and the output 112**.

Figure 3:
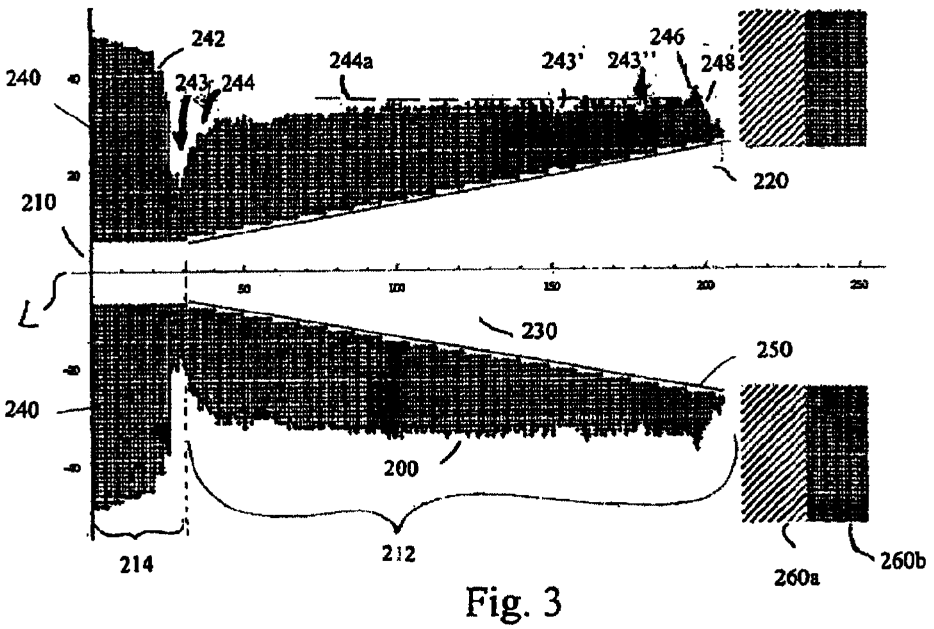
FIG. 3 is a cross section of a preferred embodiment of a coil according to the invention.

In FIG. 3, the cross section of one embodiment of the coil according to the invention is illustrated. The coil 200 has an input end 210 as well as an output end 220.

FIG. 3 shows a longitudinal cross-section of an embodiment of a coil 200 according to the invention. The coil has an input end 210 and an output end 220 connected by an inner passage 230. In a cooling section 212 of the coil, the inner passage 230 expands linearly towards the output end 220 in the shape of a cone. In a input section 214 of the coil, the inner passage has a constant circular cross section and thus forms a cylinder extending from the input end 210 to the begin of the cooling section 212. Preferably, the cross section of the inner passage 230 at the end of the input section 214 is equal to the cross section of the inner passage 230 at the start of the cooling section 212. In one embodiment, a surface 250 encircling the inner passage 230 in the cooling section is reflective and provides the deflector. Laser beams impinging on the reflecting surface 250 are reflected towards the longitudinal axis L. In another embodiment, the reflecting surface is not provided at the outer surface of the inner passage 230 but in another shape, e.g. in the form of a cone more or less tapered than the tapering of the inner passage. Also, the reflecting surface can be arranged coaxially to the longitudinal axis in a distance to the outer surface of the inner passage 220. Further, as an example of an embodiment of the present invention, at least parts of the reflection surface can be located outside the inner passage 230. The reflecting surface can be provided in one piece or be formed of a plurality of reflectors. Further, only parts of the outer surface of the inner passage can be provided with reflectors. For a person skilled in the art, it is obvious to provide various modifications of the deflector, as long as the basic principle of the invention is fulfilled, according to which the deflector is provided in a way such that at least a part of laser light energy directed on the output end of the coil is reflected on a atom beam passing the coil from the input end to the output end inclined to the longitudinal axis.

In order to provide deceleration for atoms travelling outside the longitudinal axis, the magnetic field provided by coil has to be extremely homogeneous throughout the cross section in particular at or nearby the output end since the cross section of the atom beam also extends towards the output end. In order to provide a magnetic field near the output end of the coil comprising a field strength that is nearly homogeneous throughout the transversal cross section, the winding or windings forming the coil are preferably located as shown in FIG. 3. In FIG. 3, each corresponding couple of spots ((x,y) and (x, −y)) corresponds to one loop of the winding around the inner passage. It has been found that the distribution of the individual loops shown in FIG. 3 leads to a highly homogenous magnetic field at and nearby the output end. In the input section 214, the individual loops are located between the cylindrical inner passage 230 and an outer bound. First, with increasing distance from the input end 210, the outer radius of the windings decreases exponentially forms a shoulder 242. The shoulder ends in an indentation 243, from which the outer radius increases again in a negative-exponential way, forming a second shoulder 244. The first shoulder and the indentation are both located in the input section 214, whereby the increase of windings per length forming the second shoulder 244 is located in the cooling section. The increase forming the second shoulder approaches an asymptote 244*a* in a negative-exponential progression. At the output end 220, the outer radius linearly decreases 248 after a small peak 246 towards the output end 220. At the same time, due to the increasing diameter of the inner passage 230, the minimum inner radius of the windings linearly decreases due to the conical form of the inner passage in the cooling section. Each loop depicted as spot corresponds to one component to the magnetic field distribution, each of which can be summarized by the Biot and Savart's law. Therefore, the description given above only reflects the main features leading to a homogenous field at the output end. However, also the features shown in FIG. 3 and not explicitly described above have an influence on the homogeneity of the magnetic field. Therefore, each feature that can be extracted from FIG. 3 provides a contribution to the homogeneity of the magnetic field. In particular, also the individual dimensions, the relations among the dimensions as well as and the distances from the inner passage and the longitudinal axis contribute to the homogeneity of the magnetic field. Further, an additional extraction coil 260*a*, 260*b* contributes to the flux distribution in the inner passage at the output end. Therefore, also the features regarding dimensions and distances from the longitudinal axis have to be considered. Winding 260*a* is wound in the opposite direction to windings 260*b* and 240. Of course, the windings can be provided in winding sections that are connected in series or in parallel. Further, FIG. 3 shows the distribution of the windings for equal wire sizes. If the wire size is varied, the form of the coil can be modified. Further, one spot in FIG. 3 can be one loop or can indicate a certain number of loops. For a person skilled in the art, any modification of the distribution of the individual loops is rendered obvious that does not fundamentally change the resulting magnetic field distribution, which is characterized by the position and current of the loops. In FIG. 3, the location of each single spot represents one element or loop of the set of loops, which are summarized by Biot and Savart's law resulting in the total magnetic field distribution. This is also true for FIGS. 2, 5, 6 and 7. Further, each spot in FIG. 4*b*, represents a certain current unit flowing through the respective loop.

The embodiment shown in FIG. 3 can have one, a combination of, or all features described in the following, reflecting the dimensions and geometry of the coil of FIG. 3:

In an embodiment depicted in FIG. 3, the coil comprises windings provided in the longitudinal section of the coil between an inner line and an outer line; the inner passage having a substantially uniform input radius R equal to the distance between the inner line and the longitudinal axis at the input end throughout the input section, wherein the input section extends from the input end to an x-position equal 3×R; the cooling section extends from an x-position of 3×R to an x-position of 17×R; the inner line in the cooling section being a straight line extending from a x-position of 3×R at an y-position of R to a x-position of 17×R at an y-position of 4×R; the outer line starts at the input end at an y-position of 7.5×R and exponentially dropping to an x-position of 2.8×R and an y-position of 2.8×R forming a shoulder; the outer line increases substantially negative exponentially from an x-position of 2.8×R and a y-position of 2.8×R asymptotically to an x-position of 18.9×R and a y-position of 5.3×R crossing the y-position of 4×R at a x-position of 3.3×R; the outer line increases from a x-position of 18.9×R and a y-position of 5.3×R to a x-position of 19.2×R and a y-position of 5.8×R; and/or the outer line decreases from a x-position of 19.2×R and a y-position of 5.8×R to the output end at a x-position 20×R at an y-position of 4.1×R, which is equal to the output radius of the coil. In the above, the x-position indicates the position along the longitudinal axis, the y-position indicates the position perpendicular to the longitudinal axis. The origin of the x-position is the input end and the origin of the y-position is the longitudinal axis. Preferably, all features given above are realized. However, also only some or a sub-combination of these geometry related features can be realized. The coil according to the invention also comprises an embodiment, in which not the exact values, but the values with a respective tolerance of ±1%, ±10% or ±20% are realized. Preferably, the geometry features are realized with an accuracy of 5%. Additionally, some or a combination of the features shown in FIG. 3 are realized in a preferred embodiment of the invention, which are not numerically stated above but can be measured and derived from FIG. 3. As an example, the short peak in section 243 or the slight indentations 243' and 243" are features of a preferred embodiment of the invention. The geometrical characteristics are apparent from FIG. 3 for a person skilled in the art.

Figure 4A:
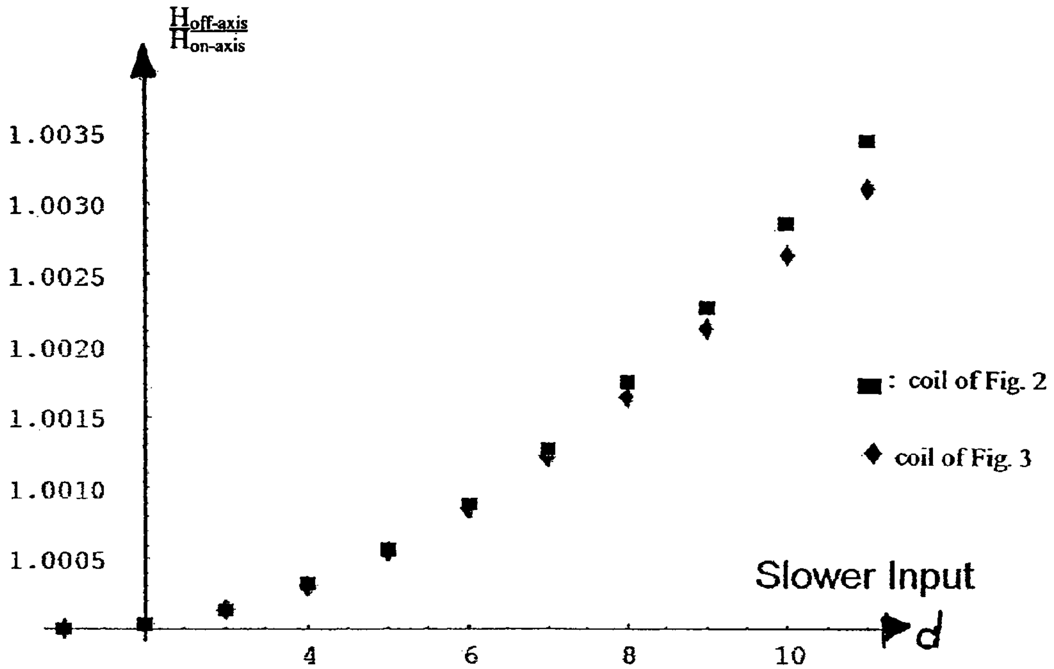
FIG. 4*a* shows the transversal homogeneity of the magnetic field for the coil of FIG. 2 and for the coil of FIG. 3 near the input end of the coil.
Figure 4B:
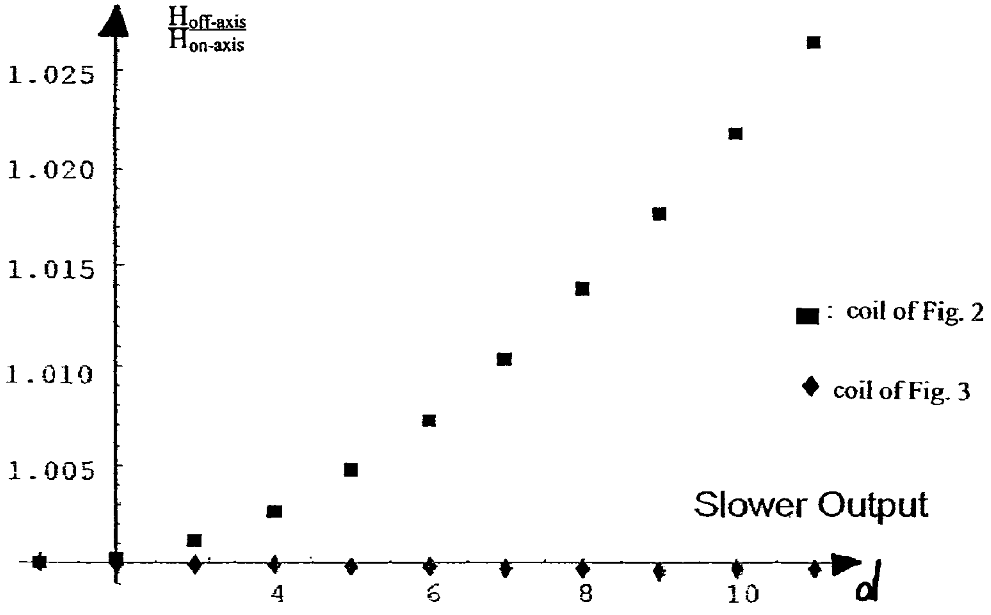
FIG. 4*b* shows the transversal homogeneity of the magnetic field for the coil of FIG. 2 and for the coil of FIG. 3 near the output end of the coil.

FIG. 4*a* refers to the magnetic field generated by the coils of FIG. 2 and FIG. 3 and shows the ratio of magnetic field strength on the longitudinal axis (the on-axis magnetic field) to the field strength at a certain distance from the longitudinal axis (the off-axis magnetic field), which is assigned on the ordinate, as a function of the distance from the longitudinal axis, which is assigned to the abscissa. The values of FIG. 4*a* show the ratio at or near the input end of the coil for the prior art coil of FIG. 2 (indicated as squares) and for the coil of FIG. 3. (indicated as diamonds). Thus, FIG. 4*a* gives an indication for the homogeneity at the input end. It can be seen that the homogeneity of the coil according to the invention is higher than the homogeneity of a prior art coil, in particular in a substantial distance from the longitudinal axis L. The fields of both coils increase with increasing distance from the longitudinal axis. Therefore, at a off-axis location, the Zeeman-detuning does not exactly compensate the Doppler-detuning. However, at the input end, the atom beam is by far more collimated than at the output end, and consequently, the transversal cooling effect, i.e. the collimation of the beam, does not play an important role as regards the cooling effect. Further, at or near the input end, the atom beam is concentrated around the longitudinal axis. In contrast thereto, it is very important to collimate the beam as it travels through the passage, in particular in proximity to the output end, to yield a high flux of atoms. Therefore, the homogeneity of the magnetic field throughout the transversal cross section at or near the output end is essential for a high flux of atoms.

Like FIG. 4*a*, FIG. 4*b* shows the ratio of magnetic field strength on the longitudinal axis to the strength at a distance from the longitudinal axis, which is assigned on the ordinate, as a function of the distance from the longitudinal axis, which is assigned to the abscissa. The values of FIG. 4*a* show the proportions at the input end of the coil for a coil of the state of the art of FIG. 2 (indicated as squares) and for the coil of FIG. 3 (indicated as diamonds). In contrast to FIG. 4*a*, which relates to the magnetic field at the input end, FIG. 4*b* relates to the magnetic field at or near the output end. As a result of the optimized winding or current loop distribution, the magnetic field of the coil according to the invention is nearly independent from the distance to the longitudinal axis. Therefore, the coil according to the invention provides the substantially same field strength throughout the complete cross section at the output end. The transversal maximal non-homogeneity of the longitudinal magnetic field at or near the output field is approx. 0.2% for the coil according to the invention shown in FIG. 3. In contrast, prior art coil illustrated in FIG. 2 shows a difference up to 2.5%. Therefore, the cooling effect of the coil of FIG. 3 on the atoms distributed over the whole transversal cross section of the passage at or near the output end is substantially higher, due to the exact mutual compensation of Zeeman-detuning and Doppler-detuning for any position in the inner passage. FIGS. 2 and 3 are a representation to scale, any relative and absolute dimensions are relevant to the invention.

Figure 5:
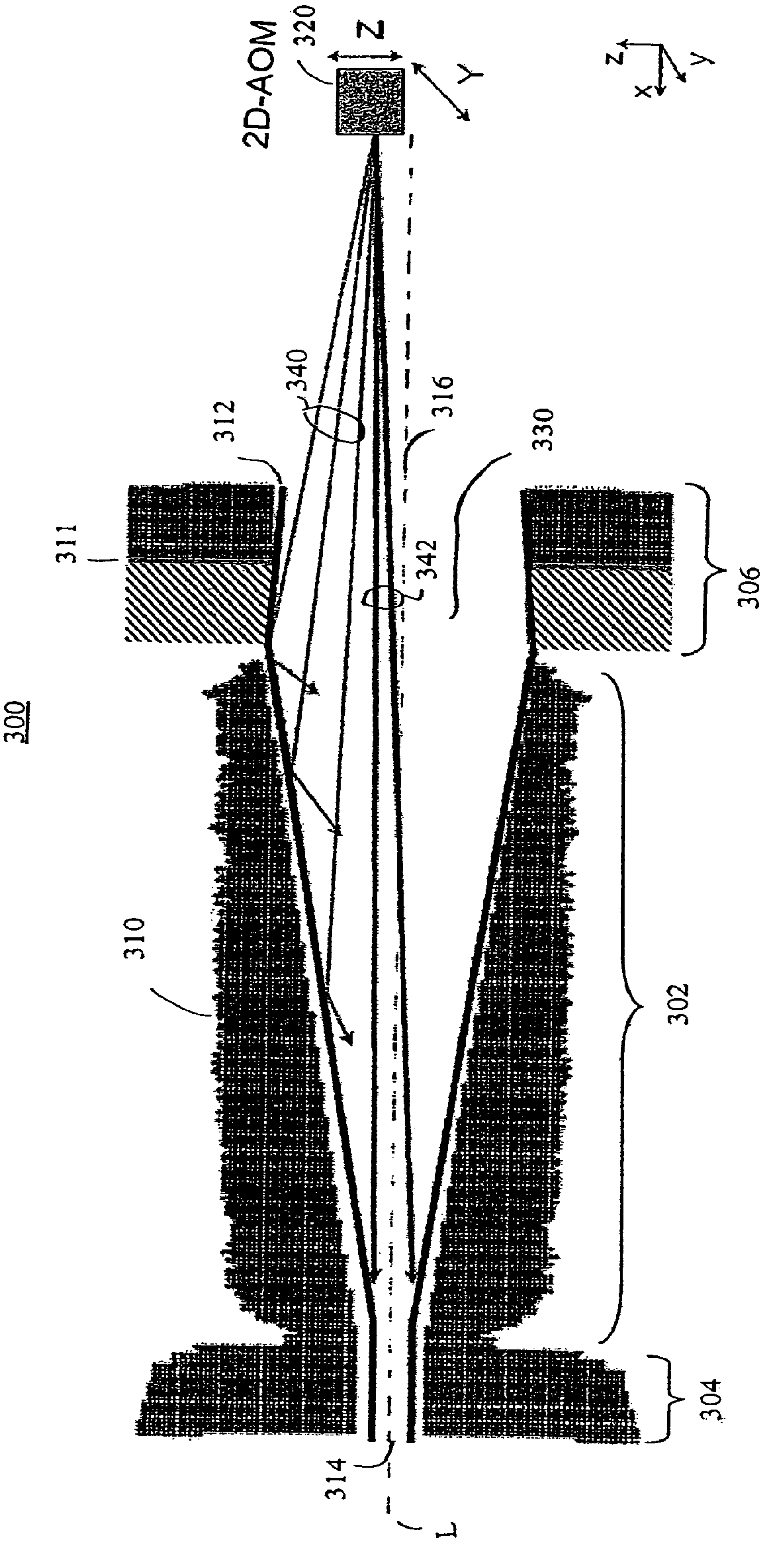
FIG. 5 is a cross section of an embodiment of the Zeeman-slower according to the invention.

FIG. 5 illustrates an embodiment of the Zeeman-slower device according to the invention. The Zeeman-slower 300 comprises a coil 310 according to the invention as well as a deflecting device 320. In the inner passage 330 of the coil 310 and partly outside the coil, a reflecting surface 312 is provided in proximity to the inner surface of the coil. The reflecting surface covers the complete inner surface of the coil and, in a cooling section 302 of the coil, expands towards the deflecting device 320. The Zeeman-slower device 300 comprises an input end 314 and an output end 316. The deflecting device 320 deflects laser beams into the output end, wherein an oven (not shown) emits atoms, e.g. atoms or other atoms, into the input end 314. The reflector expands in a cooling section 302 towards deflecting device 320 and the output end 316. A input section 304 includes the input end 314 and the reflecting surface 312 in the input section has a tubular shape with a small diameter in comparison to the diameter at the output end. In a third section 306, the reflector slightly narrows towards the deflecting device 320. In this third section 306, extraction coils 311 are arranged. Preferably, the coil 310, the extraction coils 311 and the deflecting device 320 are aligned along one common longitudinal axis L. Preferably, the deflecting device has only a small displacement from the longitudinal axis. FIG. 5 further shows some exemplary laser beams, a first part 340 of which are directed onto the reflective surface 312 and reflected towards the longitudinal axis L. A second part 342 of the laser beams is directed onto the input end 314. The laser beams 340, 342 are counter-propagating to the atom beam (not shown) emitted by the oven (not shown) into the input end 314.

The reflective surface 312 of FIG. 5 is shown as short thin tube in the input section followed by a cone expanding to a multiple of the input diameter towards the output end in the cooling section. However, the geometry and the ratio of the dimensions can be adapted to the application and to the field produced by the coil. Further, the reflective surface can also have the shape of a parabolic reflector or another shape modifying the longitudinal distribution of the reflected laser beams impinging on the atom beam. In one embodiment, the reflective surface has a shape concentrating the reflected laser beams at a location near the input end. Further, the magnitude of the transversal cooling component is directly related to the inclination of the reflected laser beam to the atom beam. For a conical reflecting surface, a laser being reflected close to the input end impinges on the atom beam in a minor angle of inclination, leading to a minor transversal deceleration component. Thus, the reflector can have a shape compensating this effect in order to provide a higher concentration of laser beams near the input end. Alternatively or additionally, the transversal deceleration component for beams impinging onto the atom beam near the input end can be increased by providing the reflecting surface in a form such that the angle of inclination for beams impinging near the input end is increased, e.g. by a parabolic shape or by adding a parabolic component to the conical shape of the reflector. In one embodiment, an exponential progression with an exponent between 0 and 1, e.g. 0.6 is used. There may be an offset of this curvature along the longitudinal axis with respect to the input end. Further, an offset to the longitudinal axis perpendicular to the longitudinal axis may be used. Also, only a part of the passage may have such a curvature. Such a reflector having a non-conical shape can be fit into the coil having a conical cooling section leaving a longitudinally varying distance between reflector and inner surface of the coil, depending on the space between the shape of the reflector and the shape of the inner wall or inner surface of the coil.

In a preferred embodiment, the deflection device 320 is an acousto-optical modulator (AOM). An AOM comprises a crystal, on which electrodes are attached. Depending on the electrical field applied by the electrodes, the optical characteristics, e.g. the refractive index and/or the birefringence, change. Typically, transparent piezoelectric crystals are used. In the crystal, zero-order and first-order of diffraction occurs. With zero-order diffraction, the incoming laser beam is not inclined, while first-order diffraction leads to an inclination. A part 342 of the laser beam energy travelling through the crystal is diffracted in zero-order, i.e. is directed along the longitudinal axis L. Another part of the laser beam energy is diffracted in first-order, i.e., is deflected inclined to the longitudinal axis and impinges onto the reflecting surface. The laser energy diffracted in zero-order is used for longitudinal deceleration or cooling, while the laser energy diffracted in first-order is used for producing a transversal component of deceleration or cooling. In other words, the laser energy diffracted in first-order is used for collimation or reducing the expansion of the atom beam towards the output end. In order to provide deflection in two directions, Y and Z, a laser beam passes through two mutually perpendicular aligned AOMs, forming a 2D-AOM.

A control unit controlling the deflection via voltages applied on respective electrodes provides a first deflection signal and a second deflection signal, the first deflection signal controlling the deflection in one direction, and the second deflection signal controlling the deflection in another direction. In a preferred embodiment, the directions form, together with the longitudinal axis, a Cartesian system. In another preferred embodiment, both deflection signals are sinewave signals having different frequencies and amplitudes in the form of: $S_1=A_1 \sin(\omega_1 t+\phi_1)$ and $S_2=A_2 \sin(\omega_2 t+\phi_2)$. The locus of both signals $S_1$ and $S_2$, $S_1$ controlling the deflection in a direction (Y) perpendicular to the direction of deflection (Z) controlled by S2, the part of the laser beam diffracted first-order generates a lissajous-curve. In an embodiment of the invention, the control unit further provides a signal for controlling the wavelength of the laser beam to support the deceleration effect. Further, the control unit can provide an additional signal for controlling the intensity of the laser beam. Additionally, the control unit can provide one or more signals for controlling the current supplied to the coil or to individual sections of the winding.

In one embodiment of the invention, the first-order diffraction in both directions perpendicular to the longitudinal axis L generates a Lissajous-pattern onto the output end of the coil, i.e. on the reflecting surface. The maximum diameter of the pattern is depending on the amplitudes of the deflection signals. Further, the location at which the laser beams impinge on the atom beam can be controlled by the amplitude of the deflection signals. In FIG. 5, the upper-most beam of beam group 340 has a high inclination to the longitudinal axis L, i.e.

corresponds to a high amplitude of the control signals. The bottom beam of beam group 340 is less inclined to the axis L and therefore corresponds to a low amplitude of the control signals. It can be derived from the optical path of both exemplary beams that the beam less inclined to the axis L crosses the atom beam at a point close to the input end 314, whereas the beam with the highest inclination hits the atom beam close to the output end 316. Therefore, by varying the amplitude, of the control signal, it can be adjusted, at which location (or at which x-position) the reflected laser beam impinges on the atom beam. Further, it is possible to take into account the velocity and the velocity distribution of the atoms in this location. By periodically scanning or sweeping the amplitudes and/or the frequencies, it is possible to tune the point for transversal cooling along the complete length of the Zeeman-slower device, in order to perform distributed instantaneous transversal cooling.

Additionally or alternatively, the frequencies of the deflection signals can be synchronised in a way, such that a "light tube" surrounding the atoms and following them from the input end to the output end or at least a part of their way in the inner passage. Preferably, this synchronisation and the frequencies of the signals depend on the velocity of the atoms. In one embodiment, the "light tube" surrounding the atoms has a cylindrical symmetry, which further supports the deceleration and cooling process. The frequency of the second deflection signal is preferably chosen such that the surrounding "light tube" provides the necessary blue detuning, i.e. including a compensation of the positive Doppler-shift, for decelerating atoms with small transversal velocities. Also, other patterns could be provided by the control unit and the deflection device, e.g. a full circle provided by signals for producing a circle line, whereby the amplitude is periodically swept. Any pattern extending over at least parts of the reflection surface could be used. The pattern as well as the shape of the coil and the reflecting surface is preferably symmetrical. However, other shapes could be used, e.g. an ovoid shape of the cross section of the coil and/or the reflecting surface. The coil can comprise multiple winding sections, which are electrically connected. Further, taps can be introduced into the windings of the coil, providing further possibilities regarding the electrical control of the currents supplied to the coil. Also, more than one laser could be used, e.g. one laser for deceleration in Y-direction and another laser for deceleration in Z-direction, each laser having one dedicated acousto-optical modulator. Additionally a further laser could be used for providing a laser beam along the longitudinal axis for providing the longitudinal deceleration.

Instead of acousto-optical modulators, other deflecting devices could be used, e.g. rotating mirrors or other devices which can be electrically controlled. Further, more than one coil can be used, forming serially connected stages, each stage having a dedicated interval of atom velocities. In this form, the cooling process can be distributed on several stages.

Figure 6:
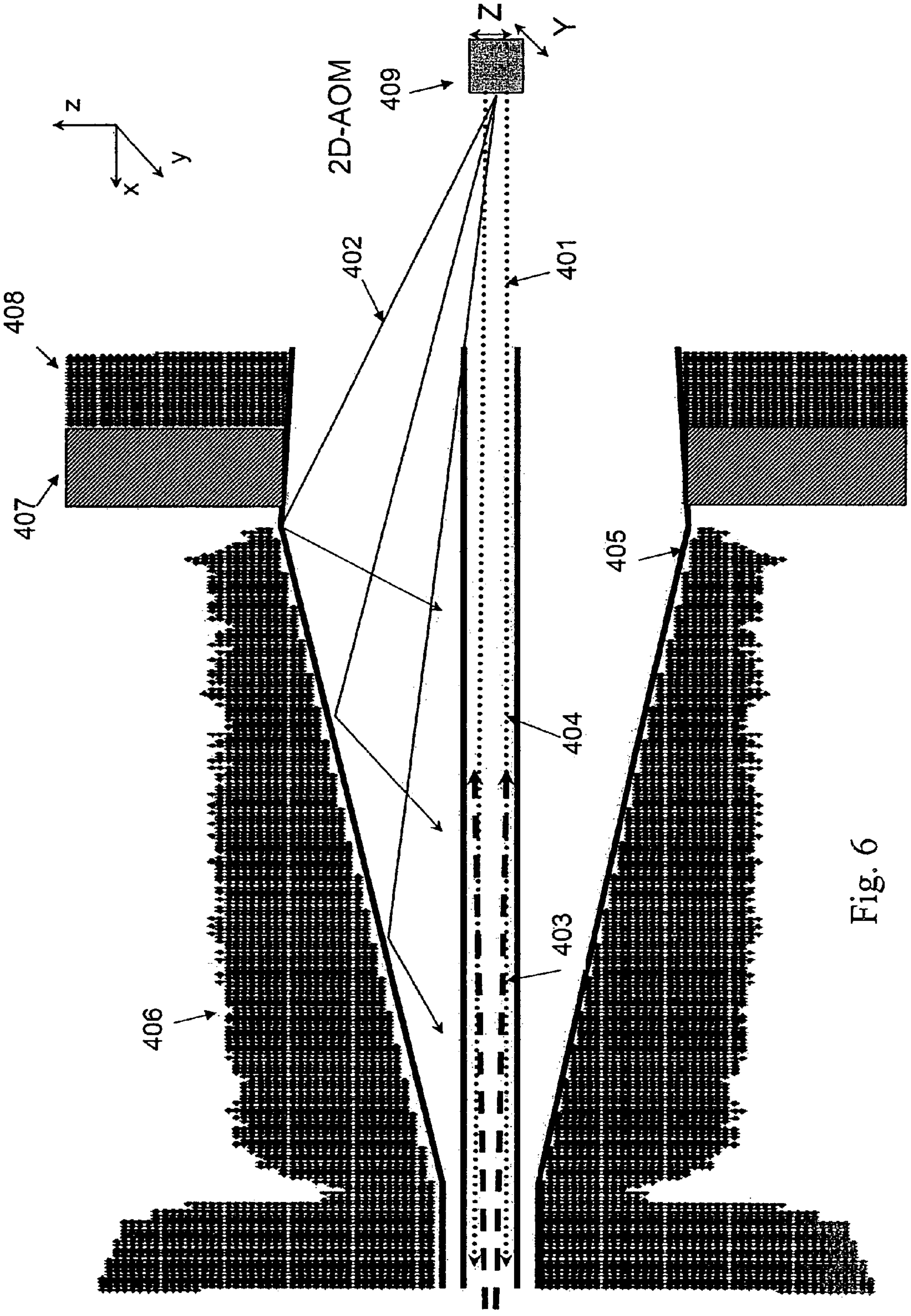
FIG. 6 is a cross section of an embodiment of the Zeeman-slower according to the invention showing the atomic beam as well as the laser beams used for transversal and longitudinal deceleration.

FIG. 6 depicts a cross section of an embodiment of the Zeeman-slower according to the invention showing the atomic beam 403 as well as the laser beams 401 402 used for transversal and longitudinal deceleration. The atomic beam 403 is emitted by an over (not shown) and provides an increasing cross sectional diameter as it travels along the longitudinal axes. Laser beams 401 are counter-propagating and provide the longitudinal deceleration, i.e. cooling as described above. According to the invention, also inclined laser beams are emitted into the passage, which are reflected by the inner surface of a wall 405 extending between the coil 406 and the inner passage. The wall comprises an reflecting surface, reflecting the inclines laser beams 402 into the passage in order to provide transversal cooling (as well as additional longitudinal cooling, depending on the angle of inclination). A quartz tube 404 surrounds the atom beam to protect the reflecting surface. In this embodiment, not the complete volume is used for cooling purposes. Rather, the volume between the quartz tube 404 and the reflecting surface 405 is used for appropriately reflecting the laser beams 402 in order to provide a high degree of inclination. Anti-phase coils 407, 408 provide a magnetic field component, which abruptly terminates the cooling condition. Coil 407 provides a magnetic field opposed to the direction of coils 408 and 406. The field produced by coils 406, 407 and 408 is parallel to the longitudinal axis of the passage an homogenous in a plane perpendicular to the longitudinal axis, ate least in the area defined by the quartz tube 404. An acousto-optical modulator 409 deflects an incoming laser beam in two directions y and z as depicted in FIG. 6. The longitudinal axis extends along an x-axis, while the x-, y- and z-directions form a Cartesian system, i.e. are mutually perpendicular.

Figure 7:
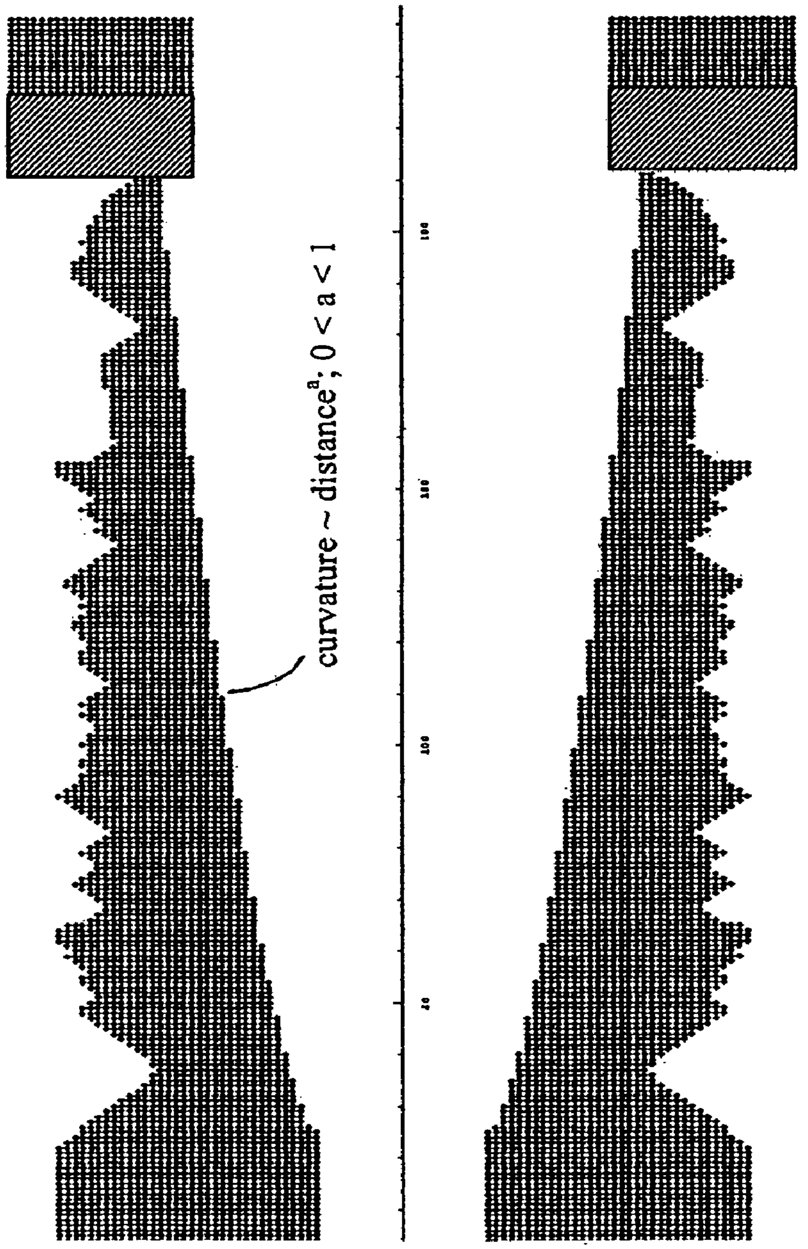
FIG. 7 is a cross section of an embodiment of the Zeeman-slower showing an exponential expansion of the passage.

FIG. 7 shows a Zeeman-slower monotonously extending from the input end. However, the increase is not constant. Rather, the radius is an exponential function depending on the distance to the input end (including an offset). The exponent used in FIG. 7 is 0.6. However, other functions may be used. With this curvature, the transversal cooling performed by the laser beams reflected by the inner surface of the passage can be concentrated on a section near the input, while less transversal cooling occurs in the part near the output of the atomic beam. Further, the increasing collimation due to the transversal cooling can be taken into account, which leads to a atomic beam having a cross section with a similar progression. The windings shown in FIG. 7 being arranged around the passage produce a field reflecting the non-linear curvature of the inner passage. FIG. 7 is a representation to scale, similar to FIGS. 2 and 3, and any relative or absolute dimensions of the windings representing the coil are relevant to the invention. This is also true for FIGS. 2, 3, 5 and 6. With the winding arrangement shown in FIG. 7, a field can be provided being homogeneous in a plane perpendicular to the longitudinal axis. Further, the field decreases along the longitudinal axis and is terminated by the antiphase coils depicted at the end of the passage.

The invention claimed is:

1. A Zeeman-slower comprising:

a cooling section including an inner passage extending along a longitudinal axis, the inner passage having a cross-section perpendicular to the longitudinal axis, wherein the area of the cross-section of the inner passage increases monotonously along the longitudinal axis at least in a part of the cooling section.

2. A Zeeman-slower of claim 1, wherein the cooling section extends along the longitudinal axis from an input end to an output end, wherein the area of the cross-section at the output end is at least 120% of the area of the cross-section at the input end.

3. A Zeeman-slower of claim 1, wherein the cross-section of the inner passage has a circular shape.

4. A Zeeman-slower of claim 1, further comprising a coil surrounding the inner passage to provide a magnetic field in the inner passage in the direction of the longitudinal axis, wherein the magnetic field decreases monotonically along the longitudinal axis and is substantially homogeneous in the cooling section in a plane perpendicular to the longitudinal axis.

5. A Zeeman-slower of claim 4, further comprising at least one extraction coil adjacent to an output end and arranged to produce a magnetic field, which is substantially different from the magnetic field in the inner passage near the output end produced by the coil surrounding the inner passage.

6. A Zeeman-slower of claim 1, further comprising a deflector configured to deflect at least a part of light impinging onto the deflector into the inner passage and inclined to the longitudinal axis.

7. A Zeeman-slower of claim 6, further comprising a reflective surface in at least parts of the inner passage, the reflective surface configured to receive light from the deflector and to reflect light into the inner passage inclined to the longitudinal axis.

8. A Zeeman-slower of claim 6, wherein the deflector is configured to deflect light into the inner passage producing a light energy distribution in the cross-section of the inner passage, the light energy distribution being rotationally symmetrical to the longitudinal axis.

9. A Zeeman-slower of claim 6, further comprising:

a laser device emitting a laser beam on the deflector, the deflector configured to modulate an angle between the longitudinal axis of the at least one coil and the laser beam.

10. A Zeeman-slower of claim 6, wherein the deflector is configured to direct light onto the cross-section of the output end to illuminate an output end with a distribution of light energy covering at least a partial area of the output end.

11. A Zeeman-slower of claim 1, further comprising means for providing an atom beam that enters the inner passage through the input end and leaves the slower through the output end.

12. A coil having an inner surface configured to define the inner passage of the Zeeman-slower of claim 1, the inner surface comprising at least one reflective area adapted to reflect light into the inner passage.

13. A method for cooling an atom beam, comprising:

providing a magnetic field;

emitting an atom beam into the magnetic field;

directing at least a part of a light beam onto the atom beam; and providing an inner passage having a cross-section, which increases monotonously along a longitudinal axis, the inner passage configured to accommodate the atom beam, wherein the emitting an atom beam includes emitting an atom beam along the longitudinal axis, the atom beam having a cross section substantially expanding in a direction perpendicular to the longitudinal axis.

14. A method of claim 13, wherein the area of the cross-section of the atom beam and/or of the inner passage is expanded in total at least about 20% along the longitudinal axis.

15. A method of claim 13, wherein the providing a magnetic field comprises providing a magnetic field with a component parallel to the longitudinal axis, the longitudinal magnetic field component having a magnetic field strength decreasing along the longitudinal axis, the longitudinal magnetic field component being substantially homogenous in a plane perpendicular to the longitudinal axis, the method further comprising:

providing an additional deceleration of the atom beam in a direction perpendicular to the longitudinal axes by directing the at least part of a light beam onto the atom beam in a direction inclined to the propagation direction of the atom beam.

16. A method of claim 15, wherein the directing at least a part of a light beam onto the atom beam comprises reflecting at least a part of the light beam onto the atom beam and inclined to the atom beam, at a location substantially displaced from the longitudinal axis.

17. A method for coating by carrying out the method of claim 13.

* * * * *